United States Patent [19]

Fikse

[11] Patent Number: 4,784,438
[45] Date of Patent: Nov. 15, 1988

[54] TUNNELING MACHINE ROTATABLE MEMBER

[76] Inventor: Tyman H. Fikse, 806 Shoshone Dr., La Conner, Wash. 98257

[21] Appl. No.: 831,757

[22] Filed: Feb. 20, 1986

[51] Int. Cl.$^4$ ............... E21B 10/12; E21C 25/16; F16C 35/07; F16C 43/04
[52] U.S. Cl. .................... 299/86; 175/371; 175/373; 384/563; 384/583
[58] Field of Search ............ 299/55, 56, 86, 90, 299/91, 40, 79; 175/371, 373, 372, 361–364; 384/571, 583, 563, 584, 585; 76/101 A, 101 E

[56] References Cited

U.S. PATENT DOCUMENTS

| | | | |
|---|---|---|---|
| Re. 31,511 | 1/1984 | Spencer | 299/90 X |
| 892,180 | 6/1908 | Patten et al. | 175/373 X |
| 2,160,420 | 5/1939 | Scribner | 384/571 |
| 2,407,532 | 9/1946 | Boden | 384/583 X |
| 2,606,799 | 8/1952 | Weckstein | 384/571 |
| 3,139,148 | 6/1964 | Robbins | 299/86 |
| 3,216,513 | 11/1965 | Robbins et al. | 175/364 |
| 3,679,009 | 7/1972 | Goodfellow | 175/372 X |
| 3,791,705 | 2/1974 | Schimel | 384/571 |
| 3,884,312 | 5/1975 | Williams | 175/372 |
| 4,004,645 | 1/1977 | Rees et al. | 175/373 |
| 4,092,054 | 5/1978 | Dye | 175/371 X |
| 4,172,621 | 10/1979 | Yoshida | 384/563 |
| 4,454,923 | 6/1984 | Tibussek | 299/86 X |
| 4,533,812 | 8/1985 | Lorenz | 76/101 A X |

FOREIGN PATENT DOCUMENTS 2327464 12/1974 Fed. Rep. of Germany ...... 175/372
646189 9/1962 Italy ........................ 384/584

OTHER PUBLICATIONS

Robbins Machine, Inc. document, AM1723 and AM1724 Cutter Disc, Jun. 1982.

Primary Examiner—George A. Suchfield
Assistant Examiner—David J. Bagnell
Attorney, Agent, or Firm—Robert W. Beach; Ward Brown

[57] ABSTRACT

Twin combined radial-and-thrust antifriction bearings in a mounting for a rotatable member, such as a tunneling cutterhead or a tunneling cutter, can be tightened or preloaded by pressing spaced bearing races against a spacer ring therebetween to contract the spacer ring. Alternatively the rotatable member may be a cutter composed of a rim mounted on a hub having an external circumferential groove extending partially under the base of such rim by a retaining ring received in such groove and having portions thereof staked beneath the rim to anchor the retaining ring in place. The cutting rim may be of generally equilateral triangle cross section having opposite base angles clipped to provide narrow parallel walls and the apex being truncated to provide a crest included angle of 80 degrees to 100 degrees. The slant slides of the cutting rim are concave to enable the apex of the rim to be sharpened more effectively.

16 Claims, 13 Drawing Sheets

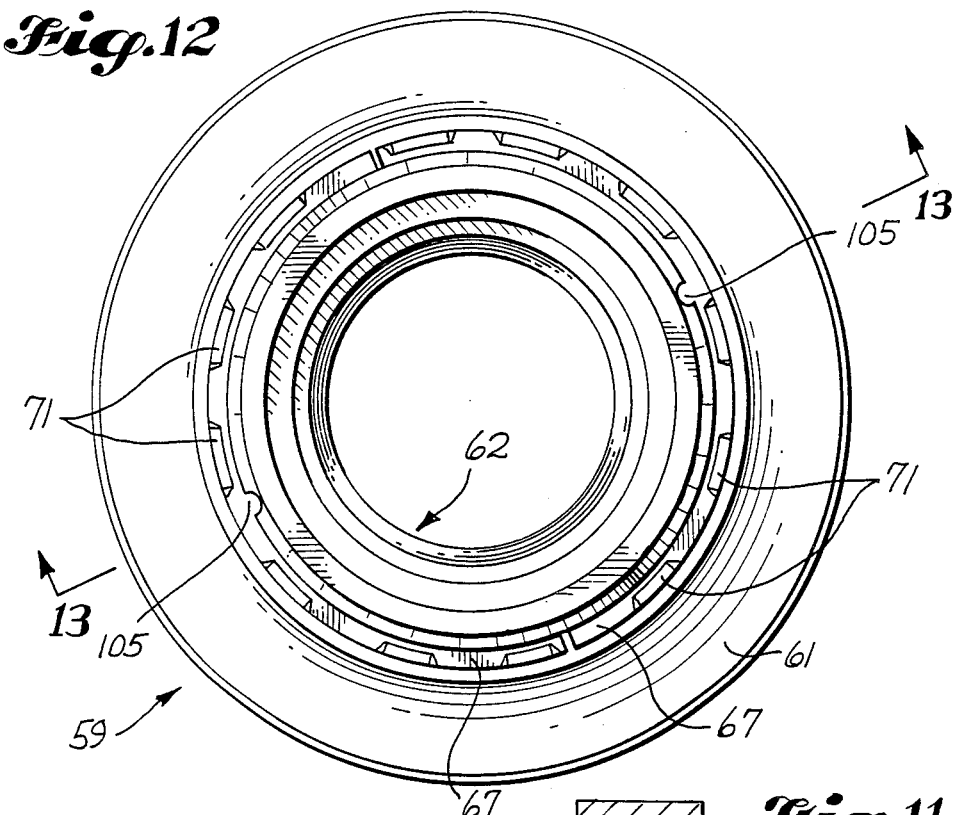
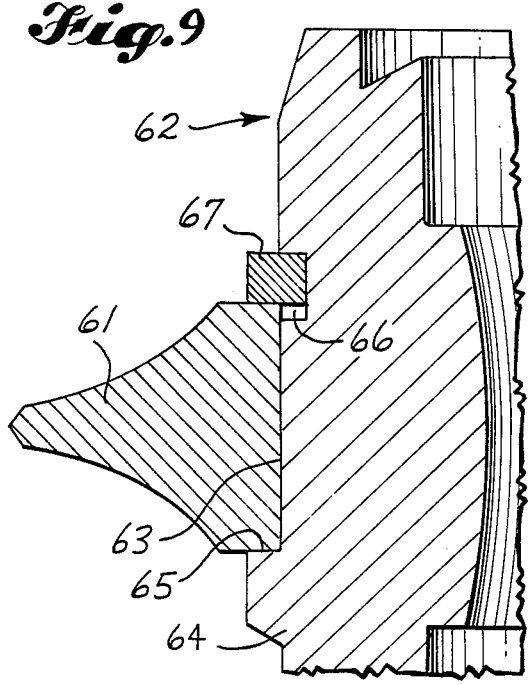
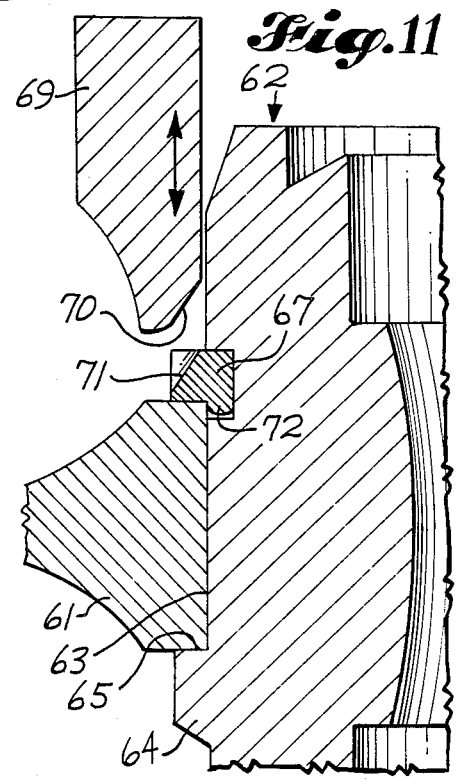

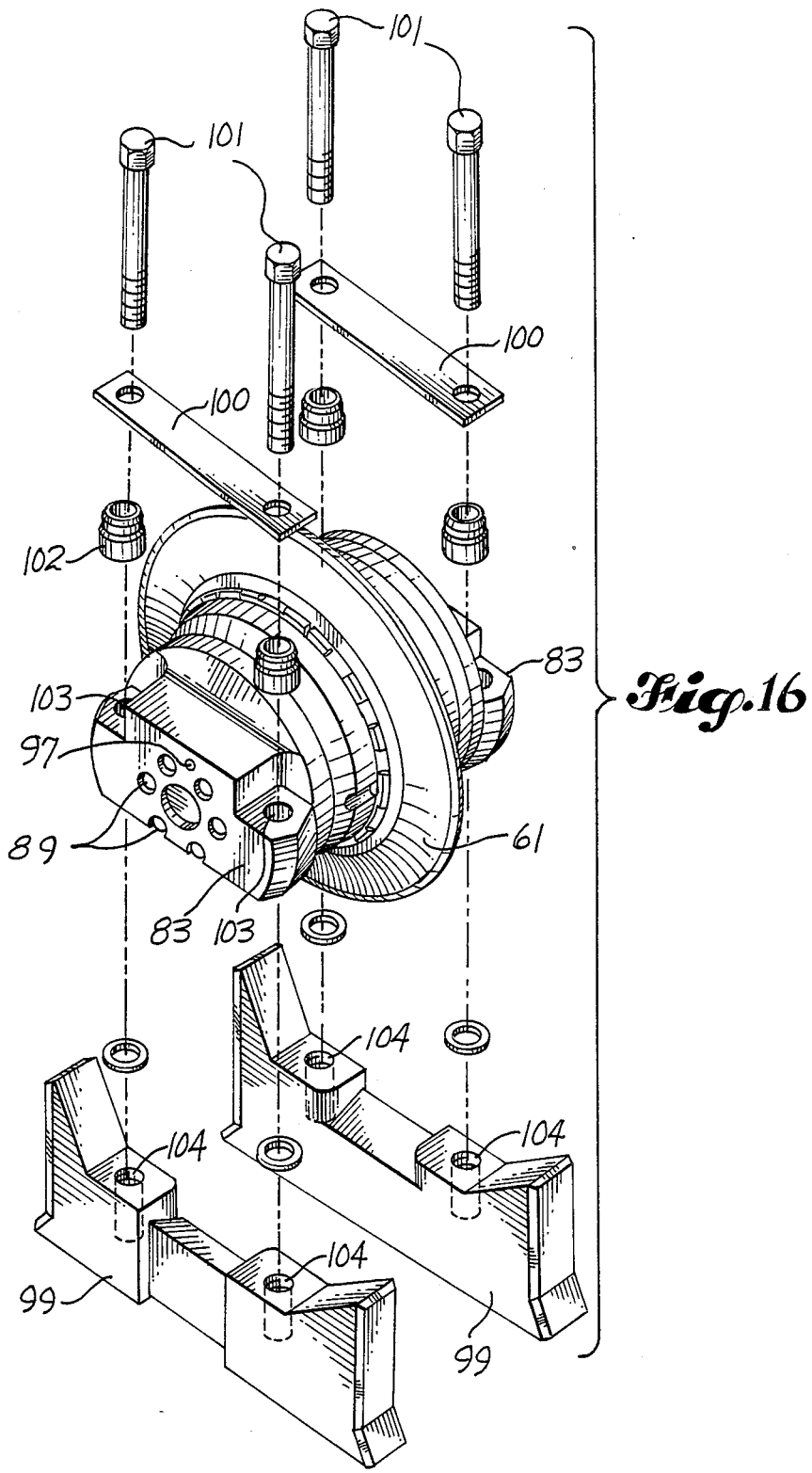

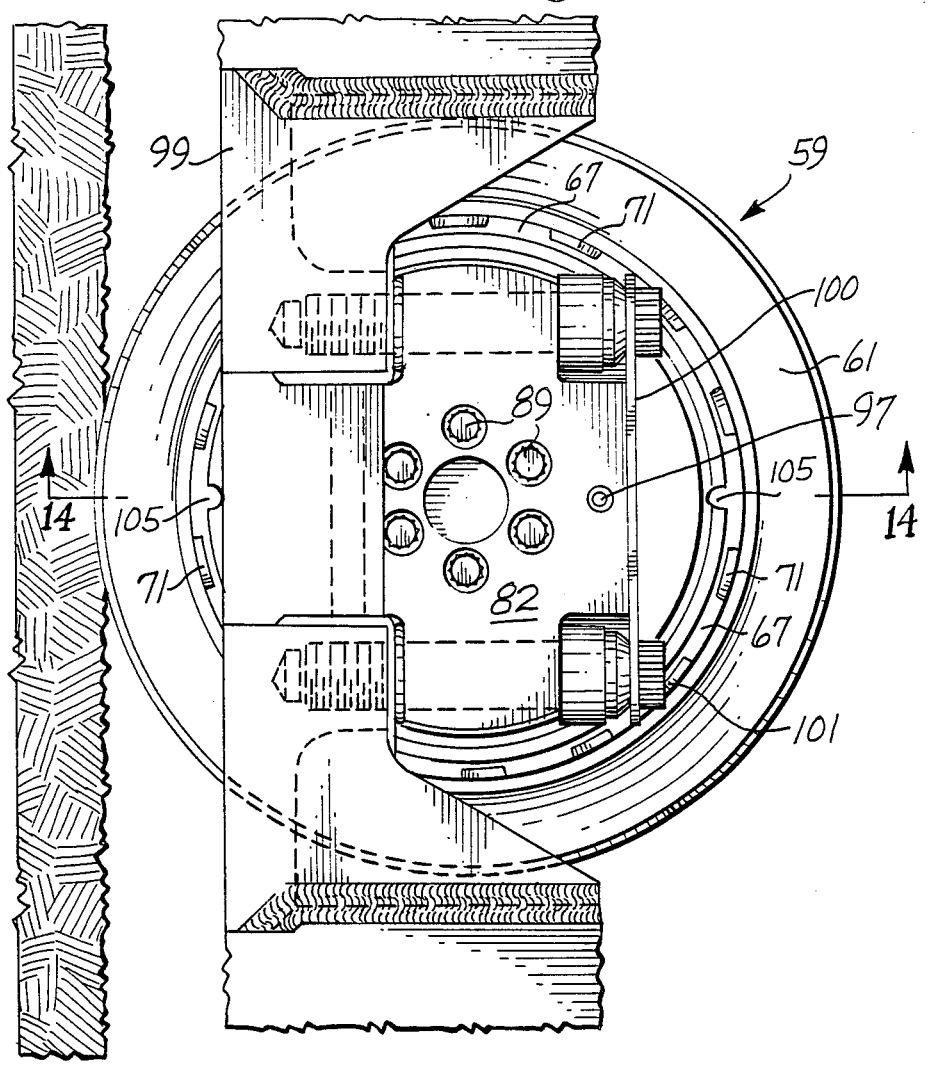

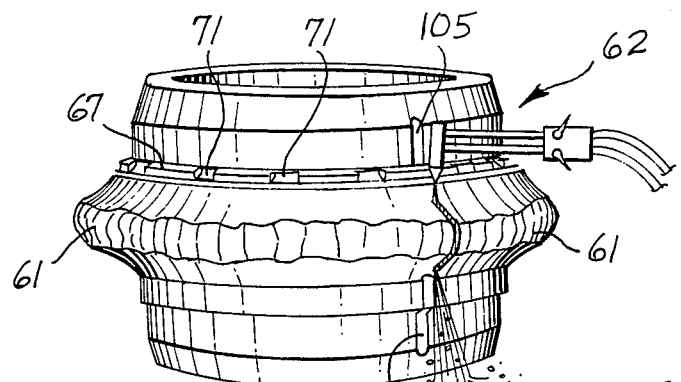
*Fig.*18
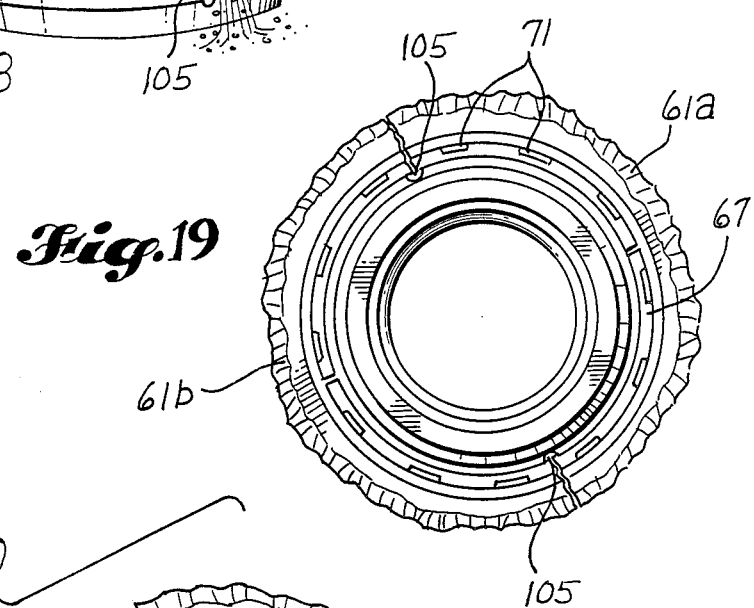
*Fig.*19
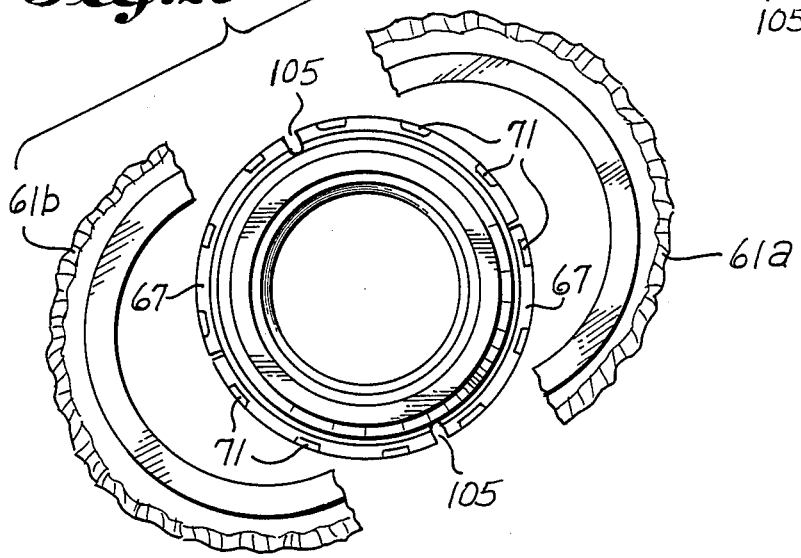
*Fig.*20

TUNNELING MACHINE ROTATABLE MEMBER

BACKGROUND OF THE INVENTION

1. Field of the Invention

This invention relates to a rotatable member construction and, more particularly, to the construction of rotatable members used in tunneling machines such as the rotary cutterhead and the rotatable cutters carried by such cutterhead.

2. Prior Art

Tunneling machines of The Robbins Company such as shown in U.S. Pat. Re. No. 31,511, issued Jan. 31, 1984 have incorporated a rotary cutterhead carrying rotatable cutters. Cutters utilizing the present invention can be arranged on a cutterhead in the manner disclosed in the Robbins patent and/or on Robbins commercial tunneling machines. Also, the construction of the tunneling machine and cutterhead to which the present invention can be applied can be of the type disclosed in the Robbins Company advertising brochure identified as 60-124-81: DGNW4/81 2500.

One aspect of the present invention relates to the use of radial-and-thrust antifriction bearings of the cone type for mounting annular rotary members on stationary central members, but such radial-and-thrust antifriction bearings or cone bearings are not new.

SUMMARY OF THE INVENTION

A principal object of the invention is to provide an improved type of radial-and-thrust antifriction bearing mounting for rotatable members to make such bearings more effective and to increase their useful life, particularly for equipment which is subjected to rough usage such as for rotary cutterheads of tunneling machines and rotatable cutters carried by such heads.

It is also an object to simplify the construction of the installation for such radial-and-thrust antifriction bearings without the necessity of requiring precise measurements or precision components.

A further object is to provide a combined radial-and-thrust antifriction bearing mounting which does not require close tolerances in its fabrication or the utilization of custom-manufactured components.

On the contrary, it is an object to provide a combined radial-and-thrust antifriction bearing installation utilizing stock parts.

Another object is to provide an installation for radial-and-thrust bearings that can be manipulated to exert on the bearing rollers pressure to any selected degree for maintaining a fit between the bearing races and rollers which is more or less tight and substantially devoid of play or backlash.

A further object is to enable the bearing installation to be adjusted easily from time to time to reset the pressure or preload between the bearing parts to restore the desired degree of bearing tightness after a period of use of the rotatable component.

An additional object is to provide a convenient construction for retaining a rim, such as a replaceable annular cutter, on a hub easily and reliably.

Another object is to provide a mounting for a rim on a rotatable hub which will facilitate removal of the rim when necessary to enable the rim to be replaced without damage to the hub structure.

The foregoing objects can be accomplished by providing a spacer between corresponding races of twin combined radial-and-thrust antifriction bearings that can be contracted deformably to adjust and establish the spacing between such bearing races for selectively altering the loading or stress to which the rollers of the bearings are subjected for setting their tightness and eliminating backlash. A rim such as of a cutter of a tunneling machine can be retained on an annular hub mounted on such combined radial-and-thrust antifriction bearings by a retainer ring received in a groove alongside the rim and having portions swaged into a part of the groove underlying such rim to lock the ring in place. The rim may have notches or axial grooves in diametrically opposite portions to identify locations where the rim can be severed by an oxyacetylene cutting torch for removal of the rim in preparation for its replacement by a new rim.

BRIEF DESCRIPTION OF THE DRAWINGS

FIG. 9 is a fragmentary radial section through a portion of the rotatable cutter mechanism shown in FIG. 8 taken on line 9—9 of that figure.

FIG. 11 is a radial section through components of the rotatable cutter shown in FIG. 10 corresponding to FIG. 9 and taken along line 11—11 of FIG. 10 showing the tool in a position adjacent to the cutter.

FIG. 12 is a plan of the finally assembled outer components of the rotatable cutter.

FIG. 16 is an end perspective of the rotatable cutter shown in FIGS. 13 and 14 and a rotatable cutter mounting shown in exploded relationship.

FIG. 17 is a plan of the rotatable cutter mounting and rotatable cutter in assembled relationship shown addressing a tunnel face.

FIG. 18 is an edge perspective of the outer components of a rotatable cutter illustrating a step in the operation of removing a worn cutting rim from the cutter hub, and FIG. 19 is a plan of the outer components of the rotatable cutter following the step illustrated in FIG. 18.

FIG. 20 is a plan of the outer components of the rotatable cutter showing the sections of the severed rim in exploded relationship relative to the cutter hub.

DETAILED DESCRIPTION

While the rotatable member construction of the present invention can have a wide variety of applications, it is especially well suited for use in rotary cutterhead tunneling machines, and, for purposes of illustration, it is shown and described as being utilized in mounting the rotary cutterhead of such a machine and in mounting the rotatable cutters carried by such a tunneling machine rotary cutterhead.

Figure 2:
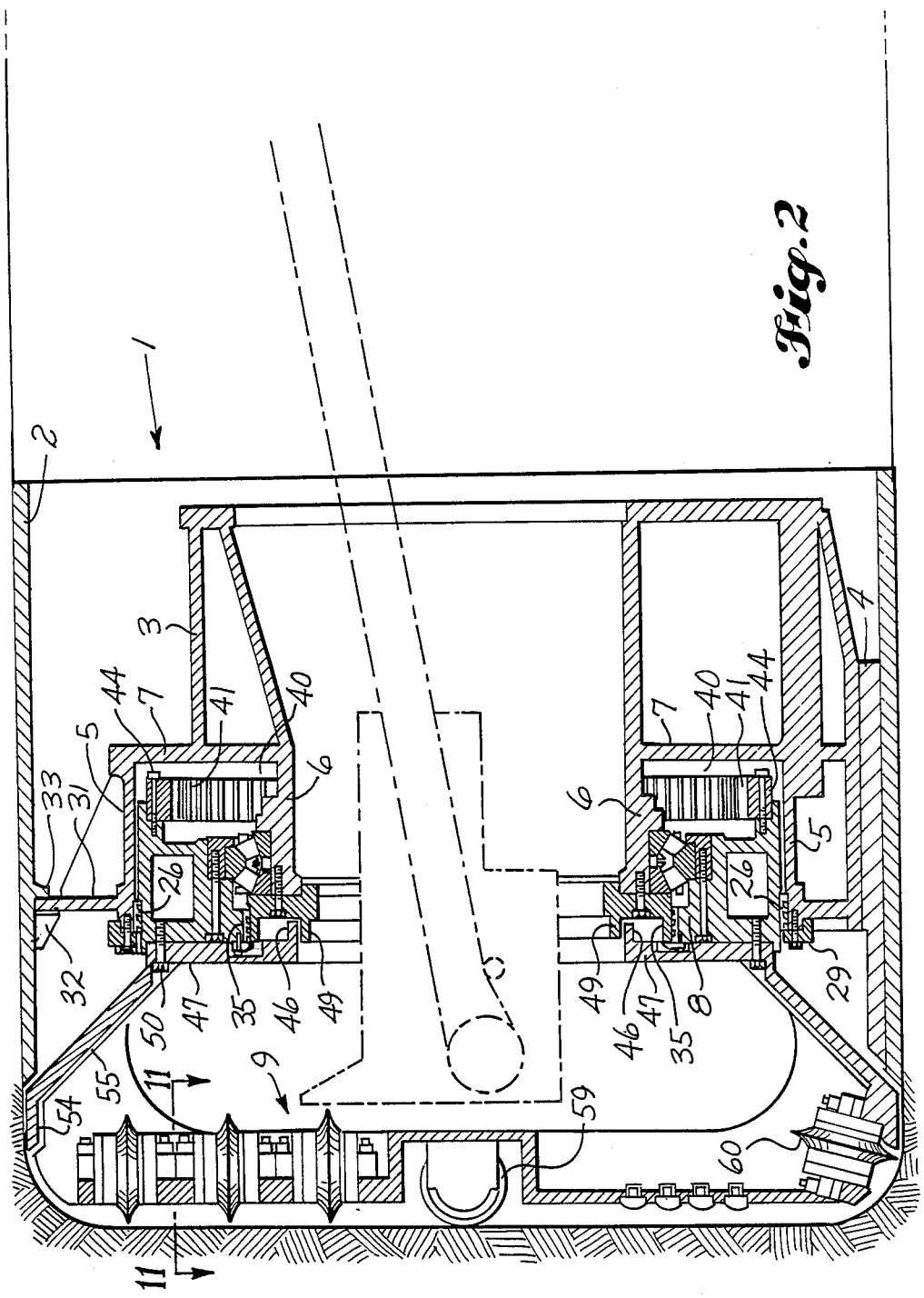
FIG. 2 is a longitudinal section through the cutterhead and cutterhead mounting portion of the tunneling machine taken on line 2—2 of FIG. 1.

The tunneling machine indicated generally as 1 in FIG. 2 has a cylindrical shell casing 2 for sliding nonrotatively through the bore of the tunnel cut by the rotary cutterhead. Details of mechanism for moving the cutterhead lengthwise of the tunnel and for removing muck excavated from the tunnel face are not shown.

The tunneling machine includes a frame 3 having a platform 4 supported on the lower inner wall of the casing 2. The frame includes a cantilever outer, generally cylindrical member 5 and a cantilever inner, generally cylindrical member 6 held and supported in concentric relationship by a radial plate member 7 supporting the corresponding edges of such cylindrical members and forming a channel between them opening forwardly to receive a mounting ring 8 for a rotary cutterhead generally indicated at 9.

The rotary cutterhead mounting ring 8 is supported from the inner cantilever member 6 by twin radial-and-thrust antifriction or cone bearing rings opposing each other. One bearing ring includes the conical rollers 10 having their axes inclined toward a common focal point, which rollers extend between the outer roller-mounting ring 11 and the inner roller-mounting ring 12 and the other bearing ring has oppositely inclined conical rollers 13 extending between the outer roller-mounting ring 14 and the inner roller-mounting ring 15. The rollers 10 bear against an inner bearing race 16 and the rollers 13 bear against an inner bearing race 17, while oppositely inclined surfaces of a common outer bearing race 18 bear, respectively, against both the rollers 10 and the rollers 13. Such outer bearing race is held edgewise in contact with a shoulder of the cutterhead mounting ring 8 by a clamp ring 19 drawn toward the mounting ring shoulder by draw tap bolts 20.

The inner bearing races 16 and 17 are slidably mounted on an external cylindrical surface 21 of the inner cantilever cylinder 6. Movement of inner race 17 away from the cutterhead is limited by its abutment with a radial surface 6' of such cylindrical member. The two inner races 16 and 17 are separated by a spacer ring or sleeve 22 interposed between them and also slidable on the cylindrical surface 21. Pressure axially of the mounting ring 8 can be applied to inner bearing race 16 by a crowding ring 23 connected to the edge of the inner cylindrical cantilever member 6 by draw tap bolts 25. The combined width of the bearing races 16 and 17 and the intermediate spacer sleeve 22 is such that when the crowding ring 23 is in abutment with the race 16, there will be a space 24 of ten-thousandths to fifteen-thousandths of an inch between such crowding ring and the adjacent edge of the cylindrical member 6.

Figure 3:
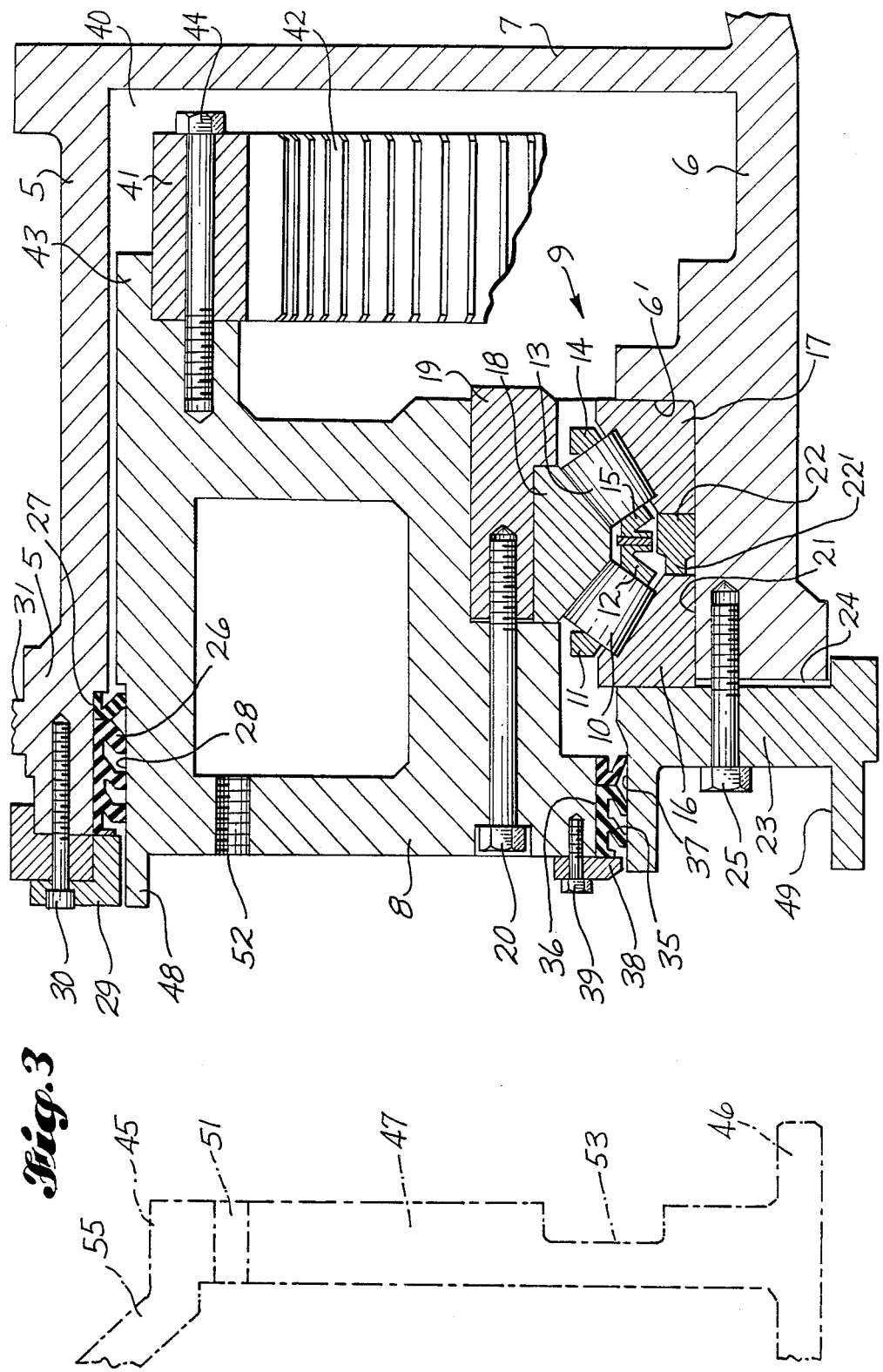
FIG. 3 is a longitudinal section through part of the cutterhead portion of the tunneling machine shown in FIG. 2 with parts broken away and parts shown in phantom.
Figure 5:
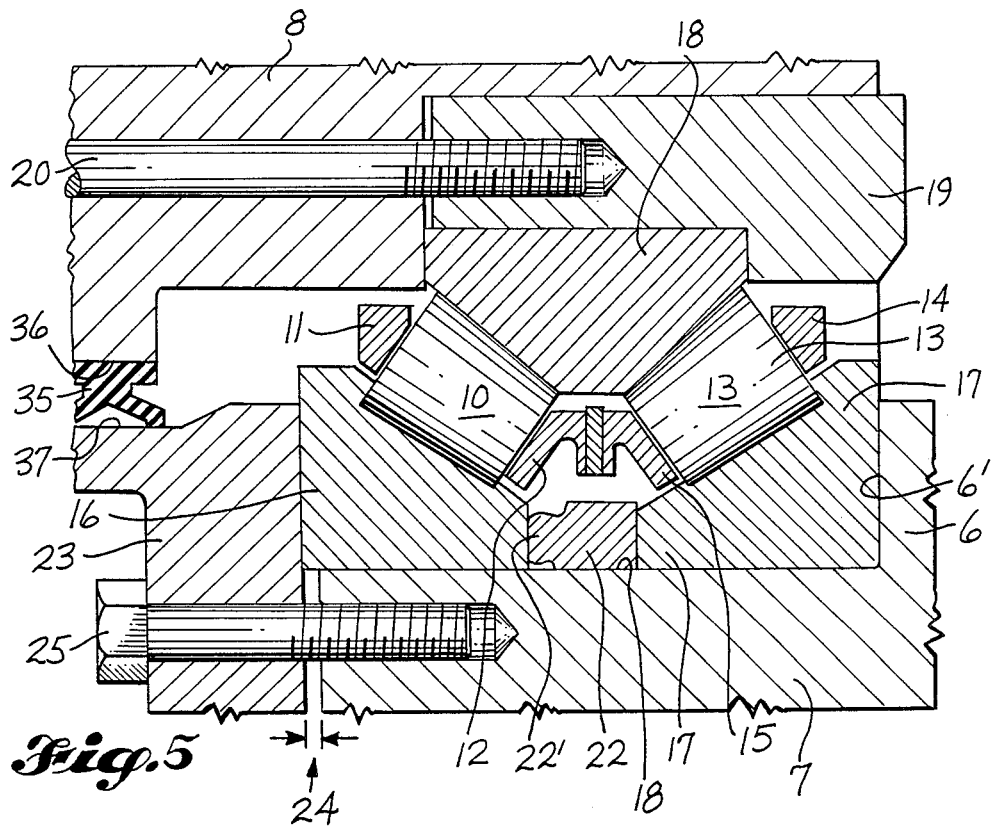
FIG. 5 is a fragmentary longitudinal section through a portion of the cutterhead mounting shown in FIG. 3 but on a larger scale and showing parts in a different relationship and FIG. 6 is a detail section through a portion of the cutterhead mounting assembly corresponding to FIG. 4 but showing parts in a different condition.

In assembling the bearing structure for the rotary cutterhead mounting ring 8, the outer bearing race 18 can be assembled with the mounting ring 8 and clamped to it by drawing clamping ring 19 into the position shown in FIGS. 3 and 5 by tightening draw tap bolts 20. The inner bearing races 16 and 17 and intermediate spacer sleeve 22 can then be slid onto the cylindrical surface 21 of the inner cylindrical member 6 prior to assembling the crowding ring 23. Next, such crowding ring is mounted by draw tap bolts 25 in abutment with the outer face of the inner bearing race 16.

It is desired for the antifriction bearings carrying the mounting ring 8 for the cutterhead to have little or no play or backlash and, preferably, for the rollers 10 and 13 to be pressed tightly between the inner and outer races such as by being preloaded under some compressive stress. Such effect can be accomplished by moving the inner races 16 and 17 relatively toward each other to press the rows of rollers against the opposite inclined sides of the outer bearing race 18.

Preloading of the twin annular rows of bearing rollers 10 and 13 can be accomplished simply by pressing the inner bearing races 16 and 17 toward each other until the desired preload on the bearing rollers has been effected and then holding the inner races in such relationship. In practice, however, particularly for the bearings of rotary tunneling machine cutterheads, it is not possible to maintain such relationship of the inner races accurately to keep the bearing rollers under a uniform and constant preload. The cutterhead cutters are subjected to severe jolts and alteration in force directions so that the cutterhead bearings are subjected to erratic jolts and vibrations and the inner bearing races 16 and 17 tend to slide along the cylindrical surface 21. Consequently, unless the inner bearing races are held rigidly in place, the bearings will shortly develop play and backlash resulting in rapid and excessive wear of various parts of the mechanism.

In order to minimize such consequences, it has been the practice heretofore to provide a rigid spacer ring 22 between the inner bearing races dimensioned as accurately as possible to maintain a given preload on the antifriction roller bearings for as long as possible. Previously, the desired, precise tightness of the radial-and-thrust antifriction bearings has been produced by measuring the inner bearing races 16 and 17 and the outer bearing race 18 precisely, thereby determining the exact spacing required for inner races 16 and 17, and then making or procuring a spacer ring 22 of exactly the right axial extent to clamp between the inner races 16 and 17. Such procedure is tedious, is inclined to be imprecise and, in any event, requires the fashioning of a custom spacer ring 22 to very close tolerances.

Instead of following such prior practice, the present invention provides a spacer ring 22 which is deformably contractable. Such result can be accomplished by making the spacer ring of material that is malleable and tough, rather than being brittle, and strong, such as brass, bronze, aluminum alloy or mild steel. Instead of providing a spacer ring of critically precise axial width, a spacer ring having excess width is utilized in an environment which enables the ring to be deformably contracted until the desired preload has been applied to the antifriction bearings.

Such axial contraction of the spacer sleeve 22 can be effected by providing the crowding ring 23 abutting an edge of an inner bearing race 16 which can be shifted toward the backing surface 6' of the tunneling machine frame against which the other inner bearing race 17 abuts and providing a space 24 between the crowding ring 23 and the adjacent end of the cantilever cylindrical member 6. The crowding ring can be shifted toward the frame surface ' by tightening draw tap bolts 25 extending through the crowding ring and threaded into tapped holes in the end of cylindrical member 6. Such tap bolts can be tightened until the deformably contractable spacer ring or sleeve 22 has been contracted axially sufficiently to produce the desired preload on the bearing rollers 10 and 13.

When the bearing rollers 10 and 13 have thus been placed under the desired preload, it is important that the inner bearing races 16 and 17 be maintained firmly in relatively fixed relationship rather than forces on the bearings effecting further deformable axial contraction of the spacer ring 22. To accomplish this result, it is desirable for the axial yielding of the spacer ring 22 to occur over only a short distance and that the resistance to further axial contraction of the spacer ring increase sharply beyond a small contraction. Consequently, instead of the spacer ring 22 being constructed to enable the deformable axial contraction to occur substantially uniformly over the entire axial width of the spacer ring, such ring is designed so that such axial contraction will be concentrated in a limited axial extent of the spacer ring.

Figure 4:
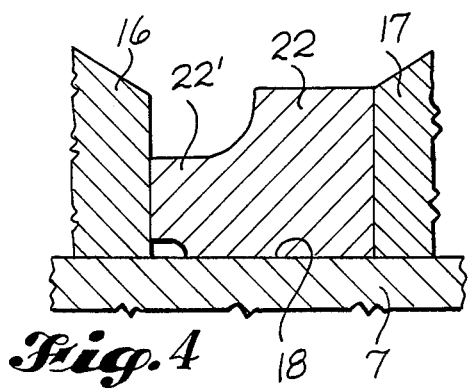
FIG. 4 is an enlarged detail section of a portion of FIG. 3.
Figure 6:
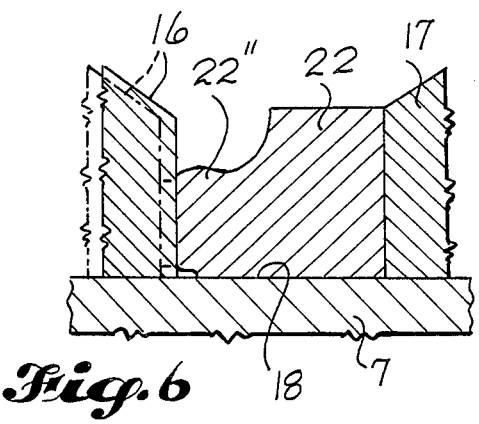

To localize the ring contraction, one or both of the inner and outer peripheries of the spacer ring is rabbeted to form an edge projection 22' of reduced radial thickness on at least one edge of the spacer ring. Consequently, when the draw bolts 25 are tightened, such thickness edge portion will be swaged from the condition 22' shown in FIGS. 3 and 4 to the radially thickened upset condition 22" shown in FIGS. 5 and 6 resulting from axial contraction to reduce the axial extent of the spacer ring for tightening the engagement of the rollers 10 and 13 with the outer race 18 and inner races 16 and 17 to preload the bearing rollers.

The space between the inner and outer cylindrical members 6 and 5 and the cutterhead mounting ring 8 between them contains considerable lubricant to facilitate relative rotation of these parts. Such lubricant is confined in such space by sealing rings closing the annular grooves between the rotor 8 and the stationary cylindrical members 5 and 6. At the outer side of the mounting ring 8, a grease seal 26 is engaged between a recessed surface 27 of the stationary cylindrical member 5 and the external recessed surface 28 on the outer periphery of the cutterhead mounting ring 8. Such sealing ring is retained in place by a retainer ring 29 of angle cross section anchored to the edge of the stationary cylindrical member 5 by tap bolts 30.

An annular thrust plate 31 projects outwardly from the outer cylindrical member 5 so that its circumference is disposed close to the casing 2. The front face of such peripheral portion bears against the rear face of a flange 32 carried by and projecting inwardly from the casing 2. As the cutterhead carrier is pressed forward against the eroding tunnel face, the peripheral portion of such thrust plate transmits pressure to the flange 32 for moving the casing 2 forward correspondingly. A second internal flange 33 is carried by the casing 2 at a location rearward of and adjacent to the periphery of the thrust plate 31 so as to integrate the cutterhead and casing components.

The space between the inner periphery of the cutterhead mounting ring 8 and the inner stationary cylindrical member 6 is closed by a grease sealing ring 35 fitting between the inner periphery 36 of the cutterhead mounting ring 8 and the external recessed surface 37 on the crowding ring 23 carried by the edge of the inner cylindrical member 6. Such grease seal is retained in place by a retainer ring 38 attached to the cutterhead mounting ring 8 by tap bolts 39.

In the space 40 between the rear side of the cutterhead mounting ring 8 and the frame wall 7 joining the root ends of the cylindrical members 5 and 6 is received the internal ring gear 41 having teeth 42 around its inner periphery. Such ring gear is located radially inwardly of a flange 43 projecting axially rearward from the cutterhead mounting ring 8. The ring gear 41 is secured to the mounting ring 8 by tap bolts 44. Such gear ring is attached to the inner side of the mounting ring 8 before such ring is mounted in the forwardly opening annular channel of the frame. The ring gear will be driven by a suitable drive pinion, not shown, to turn the cutterhead mounting ring 8 and the cutterhead 9 carried by it to perform the tunneling operation.

After the cutterhead mounting ring 8 has been installed in the tunneling machine as described, the cutterhead 9 can be mounted on the mounting ring. Proper location of the cutterhead can be assured by fitting the external circumference 45 and internal circumferential flange 46 of the cutterhead baseplate 47 shown in phantom in FIG. 3 between an external radial flange 48 and an internal radial flange 49 of the cutterhead mounting ring 8 as shown in FIG. 2. The cutterhead is then secured to the mounting ring by tap bolts 50, shown in FIG. 2, passing through apertures 51 in the cutterhead baseplate and screwed into the tapped apertures 52 in the mounting ring 8. In order to be able to fit tightly against the forward side of the cutter-mounting ring, the rear side of the cutterhead base 47 has in it a rearwardly opening annular groove 53 to fit over and receive within it the grease seal retaining ring 38 and the tap bolts 39 that mount such retaining ring.

The cutters of the cutter ring are mounted within the ring 54 of the cutterhead supported by struts 55 projecting forwardly and outwardly from the cutterhead base 47. Such ring carries generally radial bars 56, 57 and 58 forming the front working end of the cutterhead. Parallel bars 57 extend diametrically across the cutterhead spaced apart a distance to receive a diametral row of principal cutters 59 between them. The radial bars 58 are disposed perpendicular to the bars 57 and are spaced apart similarly to receive principal cutters 59 between them. Gauge cutters 60 are mounted around the circumference of the cutterhead at different angles to cut the perimeter of the tunnel face.

Figure 7:
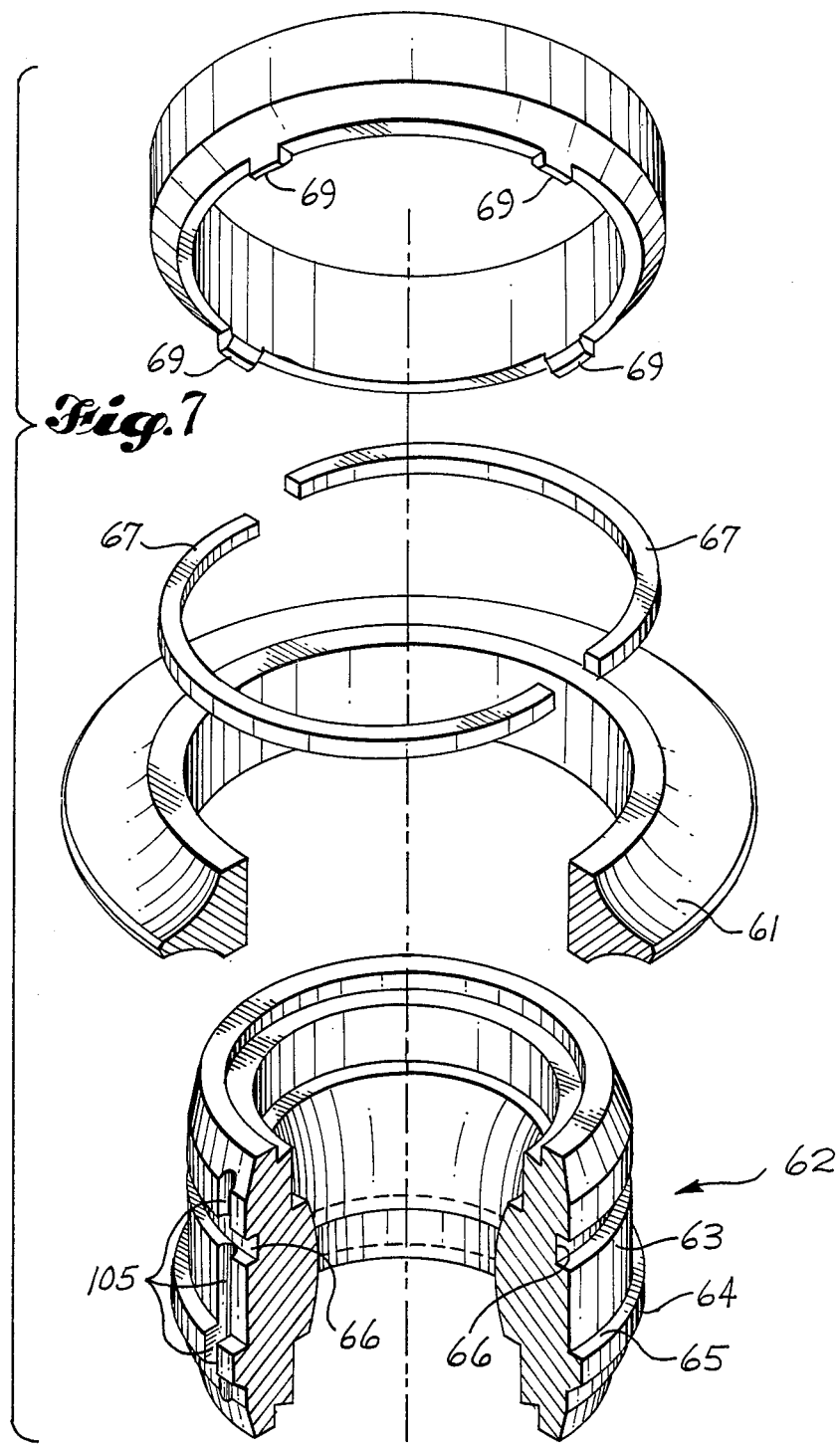
FIG. 7 is a top perspective of a portion of a rotatable cutter showing parts in exploded relationship prior to assembly and showing a tool used in the procedure of assembling the other parts of the rotatable cutter.

The construction of the individual cutters 59 and 60 is shown in FIGS. 7 to 14, inclusive. Each rotatable cutter includes a cutting rim 61 that is mounted on a hub 62. As shown in FIG. 7, such hub has an external cylindrical surface 63 bounded by a radial flange or rib 64 having an abrupt shoulder 65 perpendicular to and adjacent to the cylindrical surface 63. A groove 66 defines the circumferential edge of the cylindrical surface 63 opposite the flange 65 so as to make the axial width of such cylindrical surface somewhat less than the axial width of the cutting rim base.

The inner periphery of the cutting ring rim 61 and the external circumferential cylindrical surface 63 of the hub are proportioned so that the rim has a press fit on the hub. When the rim has been pressed into place from the position shown in FIG. 7 to the position shown in FIG. 8 with one edge of the rim in abutment with the shoulder 65 of flange 64, the opposite edge of the rim will overhang a portion of the width of groove 66, as shown in FIG. 9.

Because of the severe impacts and stresses to which the cutting rim 61 is subjected, it is not prudent to rely on the press fit between the rim and the hub to maintain these components in assembled relationship. To lock the rim 61 on the hub 62, a retainer ring 67 is fitted snugly into the portion of groove 66 which is exposed axially beyond the adjacent side of the rim 61. As shown in FIG. 7, such retainer ring can conveniently be made in two semicircular sections for ease of assembly but, alternatively, the ring could be composed of a greater number of circumferential segments or could simply be a split ring broken at one location. In any case, the retainer ring is fitted into the groove 66 alongside the rim 61, as shown in FIGS. 8 and 9.

To anchor the retainer ring 67 in the groove 66, it is staked at circumferentially spaced locations by a ring-shaped staking tool 68 having axial staking projections 69, as shown in FIGS. 7 and 9. Each of the staking projections has a staking bevel 70 shown in FIG. 11 that engages a localized portion of the retainer ring 67 as the staking ring is moved axially of the rim 61 and hub 62, as indicated in FIG. 9. Engagement of the staking projections with outer corners of the retainer ring deforms such portions to form a bevel 71 complemental to the inclined staking surface 70, as shown in FIG. 11. As the retainer ring is thus deformed, a portion 72 of the ring is swaged into the portion of the hub groove 66 underlying the rim 61 to prevent radial outward movement of the retainer ring and lock it in place.

Figure 8:
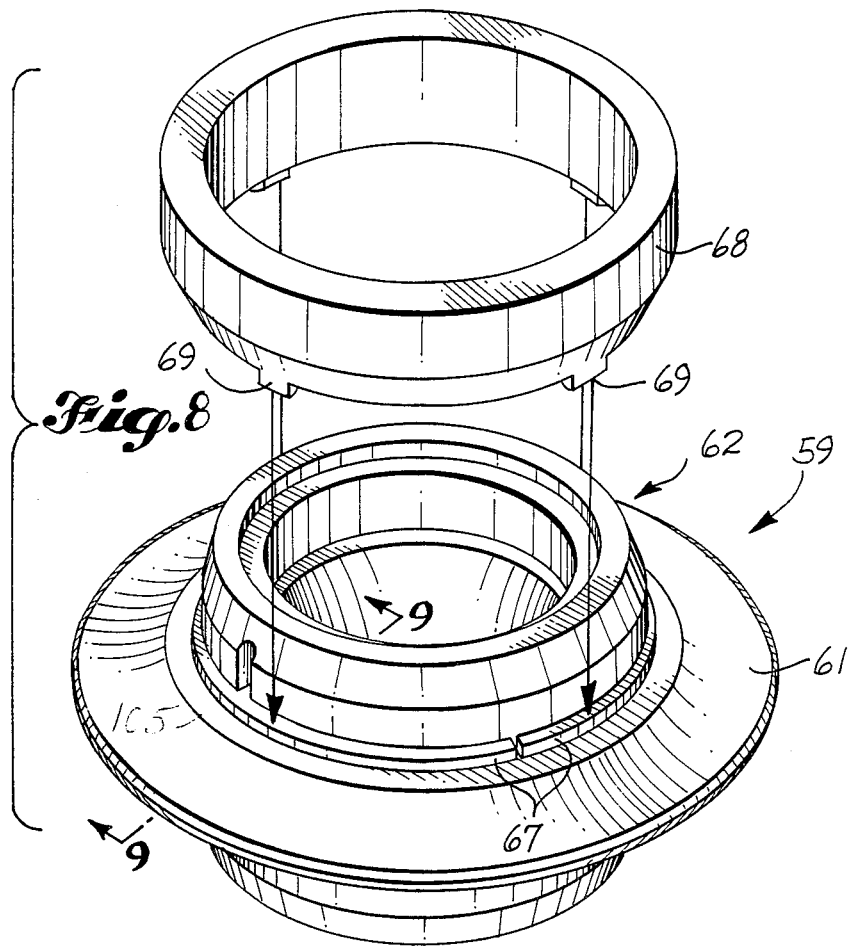
FIG. 8 is a top perspective of a portion of a rotatable cutter with the components in assembled relationship and with a tool utilized in the assembly procedure shown in exploded relationship.
Figure 10:
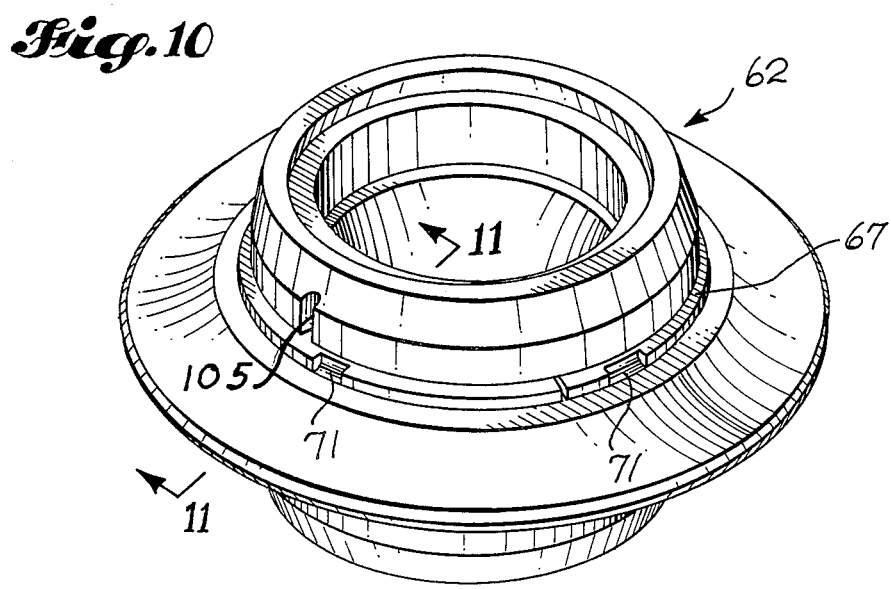
FIG. 10 is a top perspective of components of a rotatable cutter shown in assembled relationship after being subjected to an operation by the tool illustrated in FIG. 8.

Staking reciprocation of the staking ring 68 in the manner indicated in FIG. 8 will effect staking operations simultaneously at four locations spaced circumferentially of the retainer ring, as indicated in FIG. 10. The staking ring and hub can then be shifted relatively circumferentially, first 30 degrees and a second staking operation performed, and then an additional 30 degrees and a third staking operation performed. Such procedure will result in the retainer ring being staked at twelve circumferentially spaced locations, as shown in FIG. 12, so that adjacent staking locations are spaced apart approximately 30 degrees. By this procedure, the cutting rim retainer ring 67 will be locked securely to the hub so that the cutting rim cannot be displaced from or shifted axially relative to the hub under the most severe operating conditions.

Figure 13:
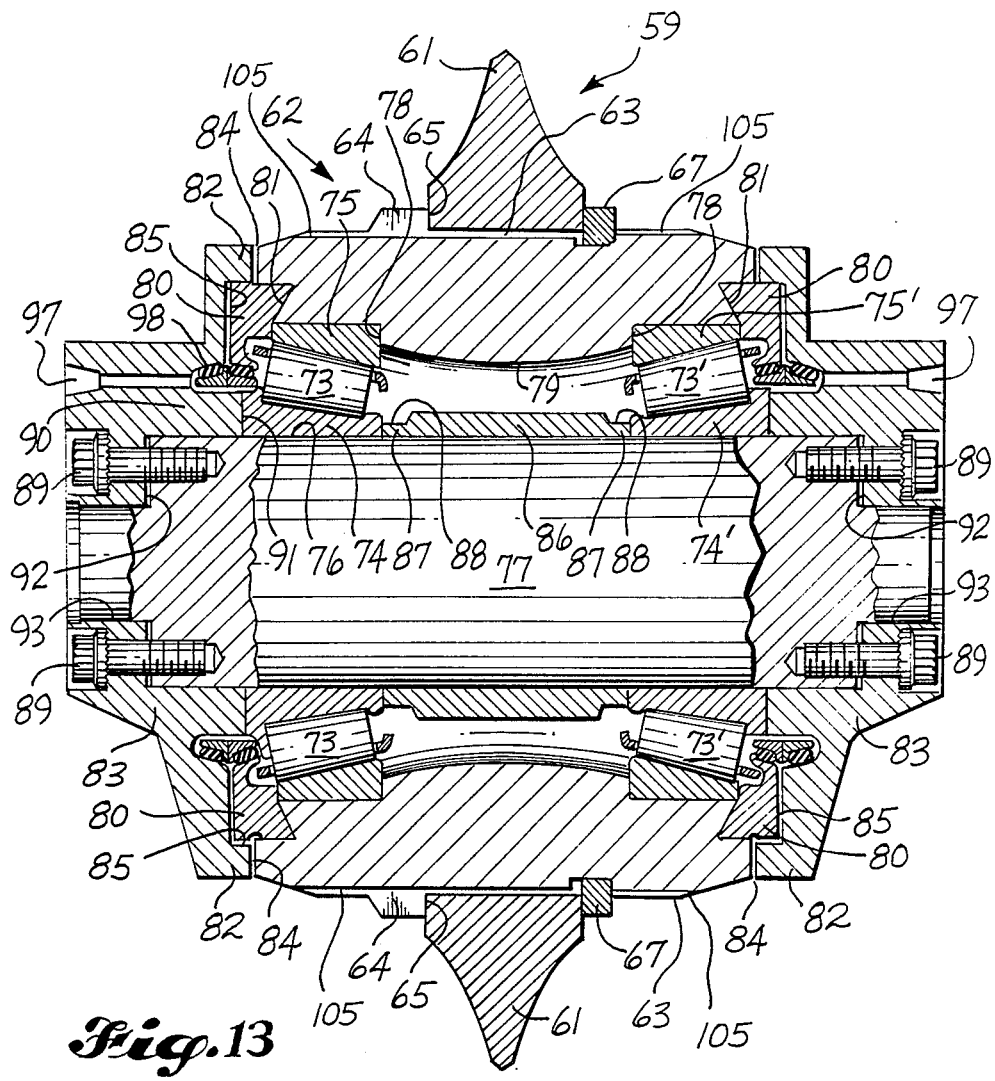
FIG. 13 is a diametral section through the rotatable cutter taken on line 13—13 of FIG. 12, parts being broken away.
Figure 14:
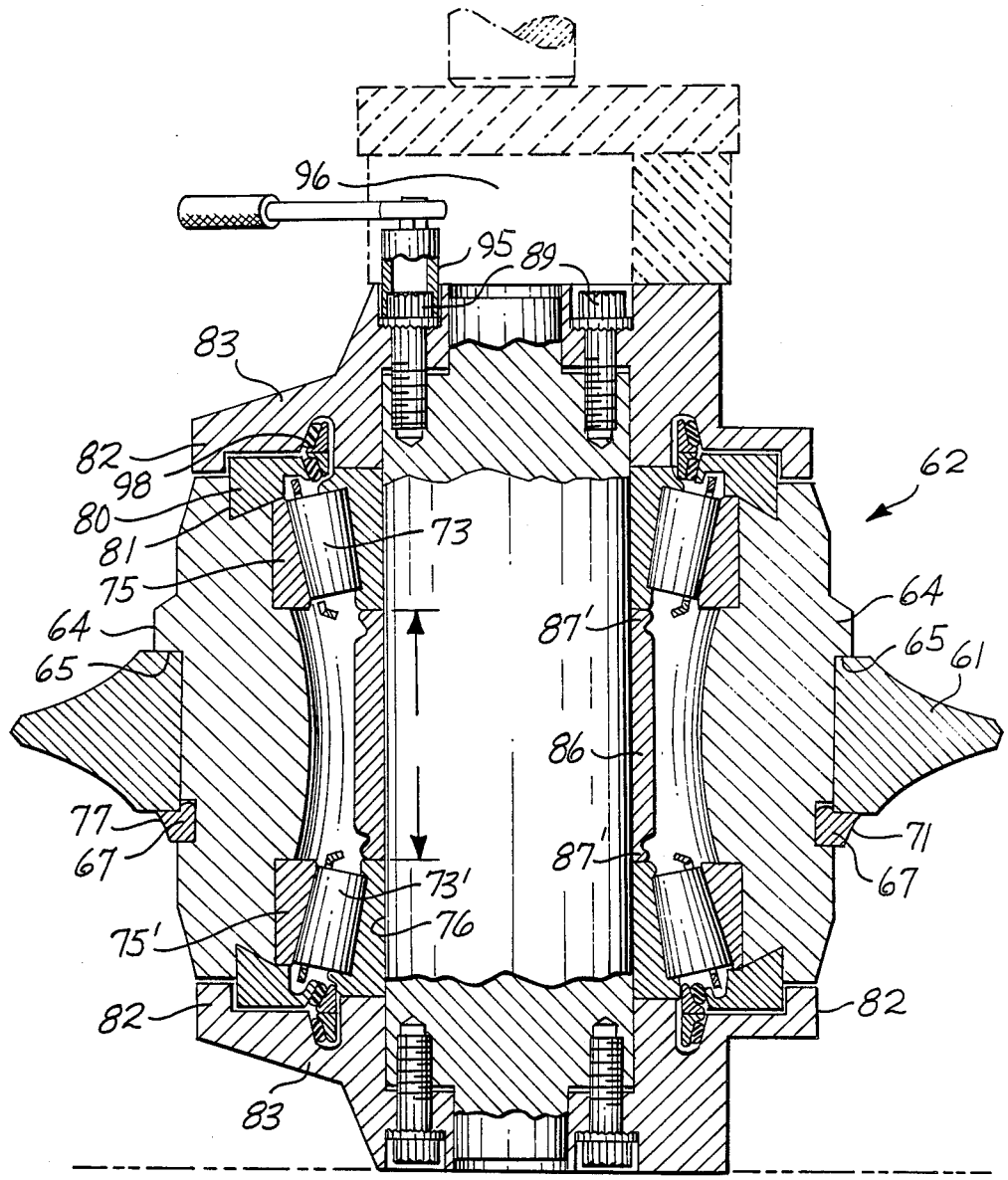
FIG. 14 is a diametral section through a rotatable cutter taken on line 13—13 of FIG. 12, but showing parts in a different relationship.

The hub and rim assembly shown in FIG. 12 is mounted by combined radial-and-thrust antifriction bearings on an axle to produce the mounted rim and hub assembly shown in FIGS. 13 and 14. The antifriction bearings are arranged to oppose thrusts in opposite directions, as shown in FIG. 13. The frustoconical rollers 73 of one bearing ring are inclined in one direction, and the frustoconical rollers 73' of the other bearing ring are inclined in the opposite direction. The axes of the rollers are inclined toward a focal point. The rollers 73 are engaged between an inner race 74 and an outer race 75, and the rollers 73' are engaged between an inner race 74' and an outer race 75'. Such inner races fit snugly on the cylindrical periphery 76 of an axle 77 so that the cutting rim and hub are rotatably mounted on the axle in idler fashion.

The outer bearing races 75 and 75' are positively spaced apart a predetermined distance by being pressed against oppositely facing internal shoulders 78 formed in the interior of the hub 62. To provide adequate strength, the inner periphery 79 of the hub between the shoulders 78 is preferably convex in cross section instead of being simply cylindrical.

During assembly of the hub-mounting components, the outer bearing races 75 are confined by retaining rings 80, the inner sides of which can engage the outer edges of the outer bearing races. Such retaining rings have angular, inwardly projecting flanges fitting complementally in acute-angled grooves 81 in the opposite edges of the hub 62. Such retaining rings locate the axially, inwardly projecting, circumferential flanges 82 of end caps 83. The axial widths of the flanges 82 are such that a clearance space 84 several thousandths of an inch wide is left between the edge of each cap flange and the adjacent edge of the hub 62. The axial width of each retaining ring 80 also is such that a clearance space 85 several thousandths of an inch wide is left between the outer side of each retaining ring 80 and the end cap 83 when the inner flange of such retaining ring is fitted snugly in the groove 81 in the adjacent edge of hub 62.

A spacer ring or sleeve 86 fits snugly, although slidably, on the cylindrical external surface 76 of axle 77 and extends axially between the inner bearing races 74 and 74', as shown in FIG. 13. The initial axial width of such spacer sleeve is such that when its opposite edges are abutted by the inner races 74 and 74', respectively, and the outer bearing races 75 and 75' are in abutment with the hub annular shoulders 78, the bearing rollers 73 and 73' will probably not be held tightly between the inner races and the outer races. The spacer sleeve 86 is made of malleable or ductile material such as brass, bronze, aluminum alloy or mild steel, so that the spacer sleeve can be contracted axially to some extent, such as a few thousandths of an inch, and thickened radially by application of pressure to its opposite edges by the inner bearing races 74. The approach movement of the inner bearing races effected during such contraction of the spacer sleeve 86 will tighten the bearing rollers and preload them.

The sleeve 86 should have such malleable characteristics as to enable it to be axially contracted and radially thickened by approach movement of the inner bearing races 74 and 74', as stated above, but when the preloading of the bearings has been accomplished, working of the cutter rim should not be able to produce forces on the bearings which will further contract the spacer sleeve 86 appreciably. In order to facilitate control of the contraction of spacer sleeve 86, it is preferred that the contraction of such sleeve be effected by localized swaging or upsetting of a portion or portions of the spacer sleeve. To obtain this result, it is preferred that an annular portion such as one or both of the annular edge portions 87 of the spacer sleeve 86 be radially thinned, such as by cutting an external rabbet in one or both edge portions of the sleeve so that axial pressure on the spacer sleeve will upset, i.e., radially thicken only the radially reduced portion or portions of the sleeve.

The axial spacer sleeve swaging pressure of the inner bearing races 74 and 74' on the spacer sleeve is accomplished by moving the end caps 83 at opposite ends of axle 77 toward each other. Such end caps are held in place on opposite ends of the axle 77 and moved toward each other by draw tap bolts 89 extending through the caps into tapped holes in the corresponding ends of axle 77. Initially, such bolts can be tightened until the inner flange 90 of each end cap is in abutment with the outer edge 91 of the adjacent inner bearing race 74 and the inner edge of each bearing race is in abutment with the adjacent edge of the spacer sleeve 77, as shown in FIG. 13. With the end cap in such position, the location of the inner bearing races 74 and 74' will transmit force through the rollers 73 and 73' to the outer bearing races 75 and 75' for pressing their inner edges into abutment with the hub shoulders 78. With the parts in such position, there is a space 92 of several thousandths of an inch between the radially inner portion of the end cap 83 which may have a central aperture 93 and the adjacent end of axle 77.

Figure 15:
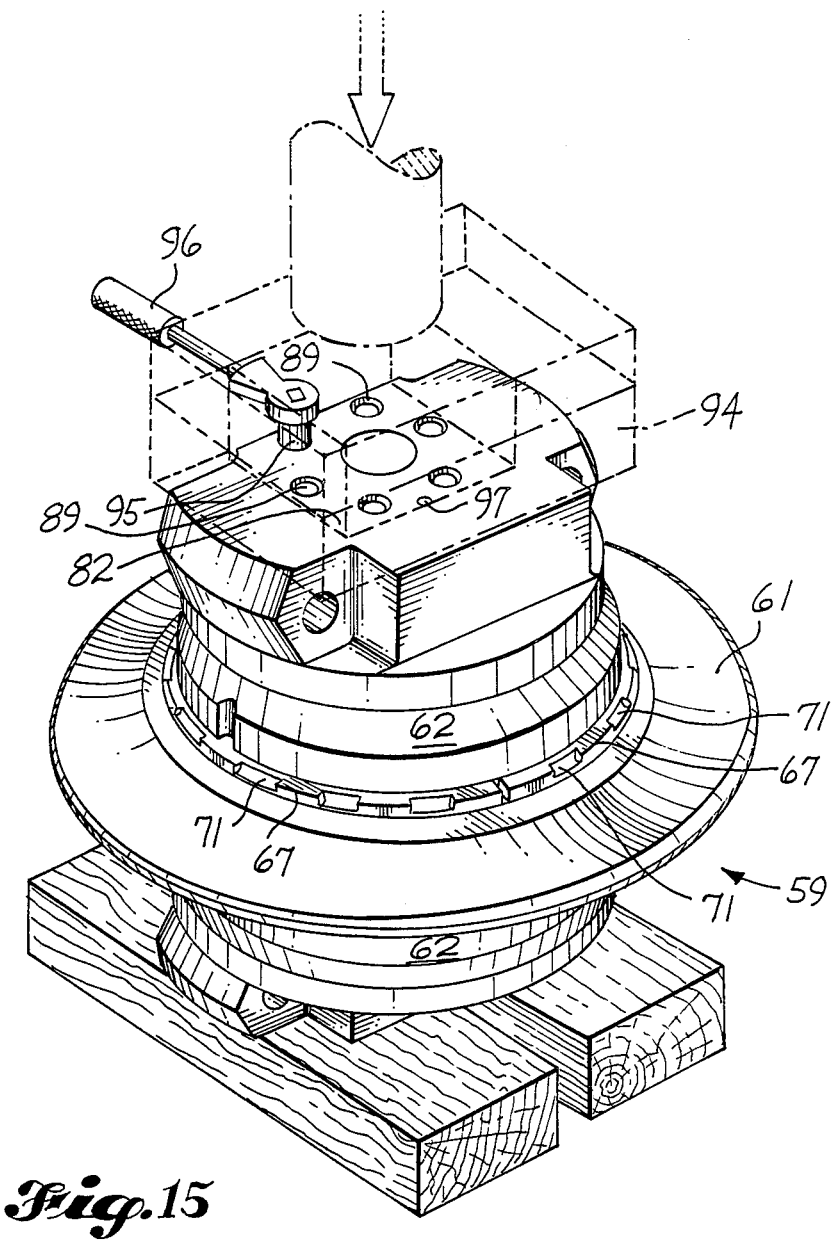
FIG. 15 is a top perspective of a rotatable cutter positioned in a press of the type illustrated in FIG. 14.

When the components of the circular cutter have been assembled to the condition described as shown in FIG. 13, the end caps 83 of the cutter can be subjected to a strong force for moving them toward each other, as indicated in FIGS. 14 and 15. With the axis of the rotatable cutter upright and its lower end cap resting on the bed of a press, a press plunger 94 can be engaged with the upper end cap 83 for moving such end caps toward each other. Such approach movement of the end caps will simultaneously tighten and preload the bearing rollers 73 and 73' and, to the extent necessary to effect such bearing preloading, will contract the spacer sleeve 86 axially such as by upsetting the reduced end portion or portions 87 of such spacer sleeve to the condition indicated at 87' in FIG. 14. While the rotatable cutter assembly is held under compression by the press 94, a torque wrench socket 95 can be fitted over the heads of the various tap bolts 89 in succession and rotated by swinging the ratchet handle 96 to tighten the tap bolts successively onto one end cap. The rotatable cutter ring assembly can then be inverted and the draw tap bolts 89 in the opposite end of the assembly can be tightened successively to hold that end cap on the other end of the axle so as to maintain the spacer ring in contracted condition.

Utilization of a contractable spacer sleeve 86 makes it unnecessary for the bearing rollers 73 and 73', inner bearing races 74 and 74' and outer bearing races 75 and 75' to have exact and known radial and axial dimensions. The initial width of the spacer sleeve must simply be sufficient so that the bearing rollers will not be tight prior to axial contraction of the spacer sleeve, but when such contraction, as described above, has been accomplished, the contracted spacer sleeve will hold the inner bearing races 74 and 74' in positively spaced relationship despite the rotatable idling cutter being subjected to severe usage and the radial-and-thrust bearings will retain their preload condition for an extended period of time. If after considerable use the bearings should lose all or most of their preload, the cutter can be removed, again placed in the press 94, as shown in FIGS. 14 and 15, and the proper degree of pressure reapplied by the press 94 to preload the bearings again to the desired degree by further contracting spacer sleeve 86, after which the draw tap bolts 89 are further taken up by the torque wrench 95, 96 to hold the end caps 82 in position for maintaining the new bearing preload conditions. Such resetting of the bearing preload condition can be accomplished as frequently as may be necessary to keep the bearings tight for reducing wear of the bearing parts.

Grease must be supplied to the roller bearings, for which purpose a grease fitting 97 is provided in each rotatable cutter end cap 83 and the grease is retained within the hub 62 by seal rings 98 interposed between each bearing and the adjacent end cap.

Figure 1:
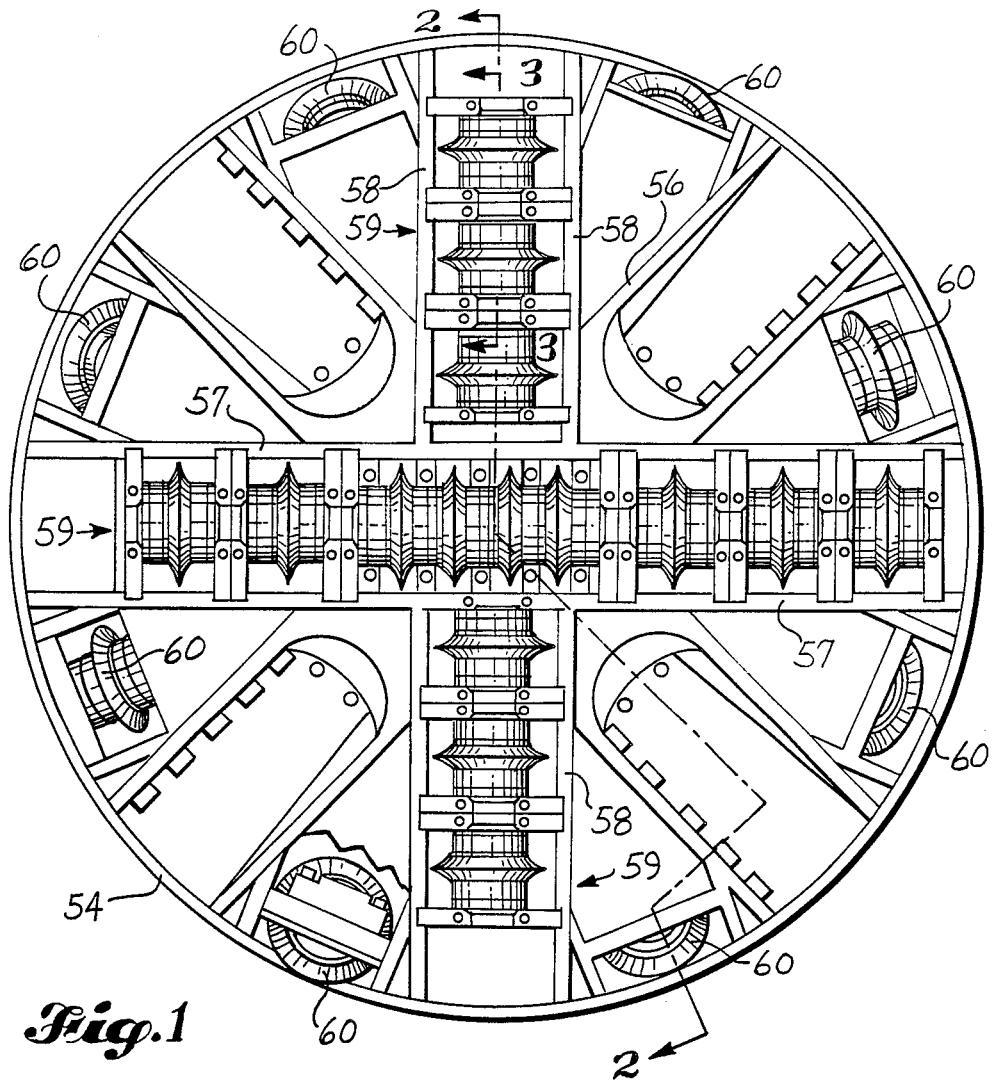
FIG. 1 is a front elevation of a tunneling machine rotary cutterhead mounted on the tunneling machine in accordance with the present invention and equipped with rotatable cutters utilizing the present invention.

After each rotatable cutter assembly has been completed, it can be assembled in a cutterhead such as of the type shown in FIG. 1 in the manner indicated in FIGS. 16 and 17. As shown in FIG. 16, the caps 83 secured to the opposite ends of the axle 77 are attached to mounting bars 99. A clamp strip 100 engages the side of the hubcap opposite each mounting bar and tap bolts 101 extend through opposite ends of such straps, spacers 102 and bores 103 at opposite sides of the end caps and are screwed into tapped holes 104 in the opposite end portions of the mounting bars 99. Such mounting bars are then secured to the radial bars 88 of the cutterhead, as shown in FIG. 1.

The chisel cutting rim 61 is of a shape in cross section to provide the most effective cutting action known. As shown best in FIG. 8, the initial cross section of the cutting rim 61 is basically of generally equilateral triangle shape. The opposite base angles of the cross section are clipped or truncated, having been omitted or removed, however, to form narrow generally parallel radial walls adjacent to the cutting rim base to facilitate clamping of the cutting rim between the hub shoulder 65 and the retainer ring 67. The width of such parallel radial walls can be from 15 percent to 25 percent of the altitude of the basic equilateral triangle cross section.

The apex angle also is omitted or removed to provide a blunted or truncated apex having a crest ridge; included angle of 80 degrees to 100 degrees, instead of 60 degrees as in an equilateral triangle, to afford a better chiseling action. Such truncating of the cutting rim apex reduces its altitude about 8 percent to 12 percent.

The opposite convergent slant sides of the cutting rim are concave upward from the radial walls instead of being flat in a radial plane to provide additional clearance. Such concavity may be formed in any radial plane of the cutting rim as a circular arc in the range of 40 degrees to 70 degrees in extent, the chord of each arc in such a radial plane will be a major portion of the slant height of the basic equilateral triangle slant sides and, as shown in FIG. 13, each arc extends continuously in smoothly curved fashion over substantially the entire distance between the radial wall and the blunted apex or peripheral portion of the rim. The hollow slant sides of the cutting rim ring also enable the blunted peripheral portion and the annular portion of the cutting rim formed by and between the concave slant sides, which are subject to dulling by wear and are of uncoated homogeneous material as shown in FIGS. 7 and 9, to be capable of being repeatedly sharpened effectively more times than would be possible if the opposite slant sides of the cutting rim were straight because the concavities produce an axially narrower rim for at least one-half of the altitude of the basic equilateral triangle.

Eventually the crest of the cutting rim will be worn sufficiently that it must be replaced. Instead of replacing the entire rotatable cutter assembly, however, or even the hub portion of such assembly, the cutting rim 61 can be removed from the hub 62 and replaced by a new cutting rim. The procedure for effecting such replacement of the cutting rim is illustrated in FIGS. 18, 19 and 20.

The grooves 105 in the cylindrical surface 63 of hub 62 located diametrically opposite each other serve as markers indicating proper disposition of an oxyacetylene cutting torch shown in FIG. 18 that can be used to burn through diametrically opposite portions of the cutting ring rim so that it will be severed into two segments 61a and 61b, which are almost exactly equal circumferentially, as shown in FIG. 19. Such substantially equal semicircular segments can readily be pried apart and pried off the hub, as indicated in FIG. 20. Such removal of the cutting rim segments exposes the portions 72 of the retainer ring 67 that were swaged into that portion of groove 66 beneath the overhanging edge of the cutting rim, as shown in FIG. 11.

When the cutting rim 61 has been removed in the manner described above, a wedge can be driven behind the swaged bulges 72 successively circumferentially of the hub to remove the circumferential sections of the retainer ring 67. The hub is then in condition for pressing onto its periphery a new replacement cutting rim 61 which is secured in place by a new retainer ring 67 following the procedure described above in connection with he assembly of the rotatable cutter components. The repaired and reassembled rotatable cutter can then be placed in the cutterhead in the manner described in connection with FIGS. 16 and 17.

I claim:

1. Mounting mechanism for mounting a rotatable cutterhead in a tunneling machine comprising mounting means arranged concentrically with the rotatable cutterhead, annular antifriction radial-and-thrust bearing means interposed between said mounting means and the rotatable cutterhead and including outer race means, inner race means and two axially spaced annular rows of bearing rollers between said outer race means and said inner race means, said outer race means being a single member having oppositely inclined surfaces engageable by said rollers in said two annular rows, respectively, means for holding said outer race means positively immobile, said inner race means including two axially spaced race members, a spacer ring interposed between said axially spaced inner race members for holding said axially spaced inner race members in axially spaced relationship, said spacer ring being upset by being thickened radially resulting from contraction axially by axial pressure exerted by relative approach movement of said axially spaced inner race members for tightening the engagement of said race means with said rollers therebetween, means for effecting relative approach movement of said axially spaced inner race members and for holding said axially spaced inner race members to maintain said spacer ring in such contracted condition, and a cutterhead mounting ring carried by said outer race means.

2. Mounting mechanism for mounting a rotatable member comprising mounting means arranged concentrically with the rotatable member, annular antifriction radial-and-thrust bearing means interposed between said mounting means and the rotatable member and including outer race means, inner race means and two axially spaced annular rows of bearing rollers between said outer race means and said inner race means, means for holding said outer race means positively immobile, said inner race means including two axially space inner race members, a spacer ring interposed between said axially spaced inner race members for holding said axially spaced inner race members in axially spaced relationship, said spacer ring being deformably contractable axially by axial pressure exerted by relative approach movement of said axially spaced inner race members for tightening the engagement of said race means with said rollers therebetween, means for effecting relative approach movement of said axially spaced inner race members and for holding said axially spaced inner race members to maintain said spacer ring in such contracted condition, said outer race means including two race members spaced apart axially, a hub carried by said outer race means and engageable with said outer race means members for holding them in positive, axially spaced relationship, an annular cutting rim mounted on said hub, said hub having an external circumferential shoulder engageable with one edge of said cutting rim and an external circumferential groove adjacent to the other edge of said cutting rim and extending partially beneath said cutting rim, and a retainer ring received in said hub groove and having portions thereof swaged into the portion of said hub groove underlying said cutting rim for locking said retainer ring in said hub groove.

3. The mounting mechanism defined in claim 2, in which the cutting ring is of generally equilateral triangle cross section in which the base angles are clipped to provide narrow, parallel, opposite sides, the apex is truncated to form a cutting edge having an included angle greater than 60 degrees, and the major portion of the slant height of the opposite inclined sides are concave.

4. Mounting mechanism for a rotatable member comprising mounting means arranged concentrically with the rotatable member, annular antifriction radial-and-thrust bearing means interposed between said mounting means and the rotatable member and including outer race means, inner race means and two axially spaced annular rows of bearing rollers between said outer race means and said inner race means, means for holding one of said race means positively immobile, the other of said race means including two axially spaced race members, a spacer ring interposed between said axially spaced race members for holding said axially spaced race members in axially spaced relationship, an annular portion of said spacer ring being more readily deformable for axial contraction and radial thickening than other annular portions of said spacer ring by the exertion of axial pressure thereon exerted by relative approach movement of said axially spaced race members for tightening the engagement of said race means with said rollers therebetween, and means for effecting relative approach movement of said axially spaced race members and for holding said axially spaced race members to maintain said spacer ring in such contracted condition.

5. The mounting mechanism defined in claim 4, in which the more readily deformable annular portion of the spacer ring is radially thinner than other annular portions of the spacer ring.

6. The mounting mechanism defined in claim 5, in which an annular edge portion of the spacer ring has a rabbet forming the radially thinner annular portion.

7. The mounting mechanism defined in claim 5, in which both annular edge portions of the spacer are radially thinner than other annular portions of the spacer ring.

8. A tunneling machine cutter including an axle, a hub rotatively mounted on the axle and a cutting ring rim having a base mounted on the hub, the improvement comprising the hub periphery having abutment means projecting radially therefrom engageable by one side of the cutting ring rim, a circumferential external groove in the periphery of the hub spaced axially from said abutment means a distance less than the axial width of the cutting ring rim base for providing a portion of said groove underlying an edge portion of the cutting ring rim base, and a retainer ring engageable in said hub groove, abutting the ring rim and having a portion swaged into the portion of said hub groove underlying the cutting ring rim base for locking said retainer ring on the hub.

9. The cutter defined in claim 8, in which the retainer ring is composed of at least two arcuate segments.

10. The cutter defined in claim 8, in which the hub has indicating marks located at diametrically opposite sides of the hub.

11. The cutter defined in claim 10, in which the indicating marks are external axial grooves.

12. A method for tightening the rollers of antifriction radial-and-thrust bearings including two spaced annular rows of rollers and two axially spaced race members with a spacer ring therebetween, which comprises providing the spacer ring between the two axially spaced race members of malleable material having an annular portion more readily deformable for radial thickening and axial contraction than other annular portions of the spacer ring by approach movement of the axially spaced race members at opposite sides thereof, and exerting sufficient axial pressure upon the axially spaced race members toward each other to effect relative approach movement thereof for contracting such more readily deformable portion of the spacer ring axially and thereby tightening and preloading the bearing rollers, and thereafter holding such axially spaced race members with the spacing ring contracted therebetween.

13. The process defined in claim 12, including effecting the relative approach movement of the axially spaced race members by tightening draw bolts.

14. The process defined in claim 12, including effecting the relative approach movement of the axially spaced race members by applying press pressure, and thereafter retaining the race members in position by tightening draw bolts.

15. A tunneling machine rotary cutter rim having an initial radial cross section of generally equilateral triangle shape with truncated opposite base angles forming opposite generally radial walls and opposite smoothly curved concave slant sides extending upward from said radial walls to a blunted peripheral portion and the smoothly curved concavity of said slant sides extending continuously over substantially the entire distance between said radial walls and said blunted peripheral portion, and at least said blunted peripheral portion and the annular portion of said cutting rim formed by and between said concave slant sides being of uncoated homogeneous material which is subject to being dulled by wear and is repeatedly sharpenable after being dulled.

16. A tunneling machine rotary cutter cutting rim having a radial cross section of generally equilateral triangle shape with truncated opposite base angles forming opposite generally radial walls and opposite smoothly curved concave slant sides extending upward from said radial walls to a blunted peripheral portion having an annular crest ridge with an included angle of 80 degrees to 100 degrees, the smoothly curved concavity of each of said opposite sides extending continuously over substantially the entire distance between said radial walls and said blunted peripheral portion.

* * * * *

UNITED STATES PATENT AND TRADEMARK OFFICE
CERTIFICATE OF CORRECTION

PATENT NO. : 4,784,438
DATED : November 15, 1988
INVENTOR(S) : Tyman H. Fikse

It is certified that error appears in the above-identified patent and that said Letters Patent are hereby corrected as shown below:

Claim 3: column 12, line 23, cancel "ring" and insert
...rim...

Claim 7: column 12, line 61, after "spacer" insert
...ring...

Claim 8: column 12, line 65, cancel "ring";
column 13, lines 1, 4, 5 and 7, cancel "ring" in each instance;
column 13, line 9, cancel "ring" (first instance).

Signed and Sealed this

Eleventh Day of April, 1989

Attest:

DONALD J. QUIGG

Attesting Officer

Commissioner of Patents and Trademarks